May 19, 1970   E. BASSAN   3,512,211
LINK HINGES

Filed Oct. 13, 1967   3 Sheets-Sheet 1

INVENTOR.
Eraclio Bassan
BY Edwin E. Greigg

May 19, 1970   E. BASSAN   3,512,211
LINK HINGES

Filed Oct. 13, 1967   3 Sheets-Sheet 3

United States Patent Office 3,512,211
Patented May 19, 1970

3,512,211
LINK HINGES
Eraclio Bassan, Rovigo, Italy, assignor to Officine Meccaniche Bassen & C., S.r.L., Rovigo, Italy, a limited-liability corporation of Italy
Filed Oct. 13, 1967, Ser. No. 675,198
Claims priority, application Italy, Oct. 13, 1966, 26,722/66
Int. Cl. E05d 3/06
U.S. Cl. 16—164          5 Claims

ABSTRACT OF THE DISCLOSURE

A link hinge comprising a pair of hollow, preferably cylindrical shells, in one of which a C-shaped link is fastened which protrudes into the second shell, C-shaped said link being provided with an arcuate slot through which passes a pin carried by lugs projecting out of said second shell, said link carrying at its outer end a pin having two projecting ends slidably inserted in grooves formed in said second shell parallel to its axis.

---

This invention relates to link hinges, that is to hinges comprising a pair of, usually cylindrical, shells each to be inserted into adjoining parts, particularly of pieces of furniture, to be swingably connected together, as a door or window wing and an adjacent post, or fixed wing, in such a manner as to remain completely concealed within the thickness of the adjoining parts to be hinged together and to permit their free swinging, by rotating about link arms connected to said cylindrical shells.

The present invention has for its object an improved link hinge which, in addition to being adapted to be rapidly fastened within the thickness of the adjoining swinging parts, permits of covering the joint by means of a strip or lath which, when the hinged parts come to be in line with each other, remains flush with both said parts, while when one of the hinged parts—which is assumed to be the *first* hinged part—is swung with respect to the other one, it surface is lifted away from the adjoining or *second* hinged part. In this manner it is possible to apply on either of the hinged parts a joint cover which, in closing position, overlaps the adjoining strip of the adjacent hinged part.

According to the invention, this end is attained by fastening to one—or first—of the two cylindrical shells a curved or C-shaped link which protrudes from the inner end of said first shell and is provided with an arcuate slot which is traversed by a pin fastened to two parallel lugs integral of the second cylindrical shell, while the head end of said curved link is provided with a transversal pin projecting from both sides of said link into a pair of longitudinal grooves running within said second shell substantially parallel to the axis of said shell; the whole being so shaped and arranged that when the hinged parts are in closing position, the adjoining strips in correspondence of the joint are in line and may be covered by a joint-covering lath, fitted to one of said hinged parts and overlapping the adjacent one, while when the hinged parts are swung towards open position, the part to which the joint covering is fastened is shifted by the co-action of the curved slot of the link, with the fixed guide pins sliding therein, away from the adjoining strip of the adjacent hinged part, which was covered by the said joint-covering lath, and vice versa.

The invention will be better understood from the following specification of two preferred embodiments of the invention which are shown by way of non-limiting example in the accompanying drawings, in which.

Figure 7:
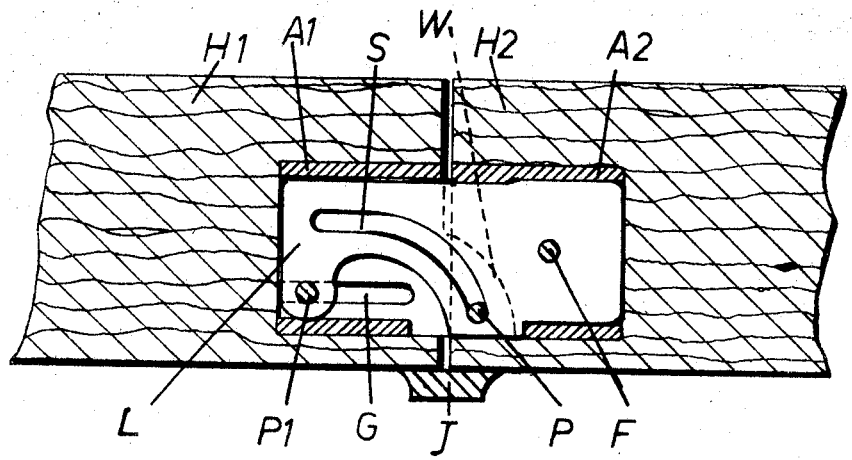
FIGS. 7 and 8 are sections through two parts hinged by means of a link hinge and provided with a joint-covering lath; the two views showing the position of the hinge parts in fully closed position and in open position (at 90° to the former position)
Figure 8:
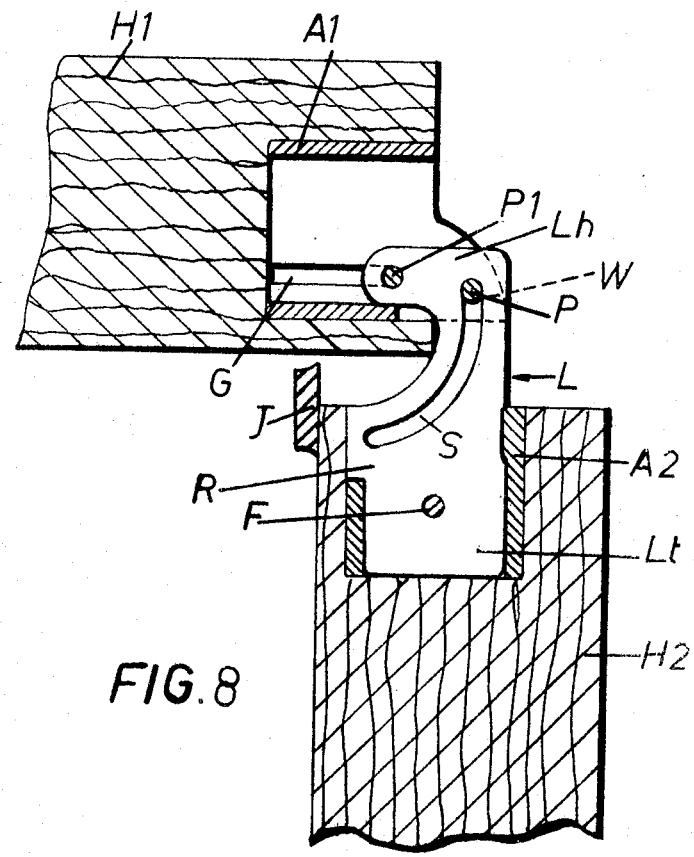
Figure 9:
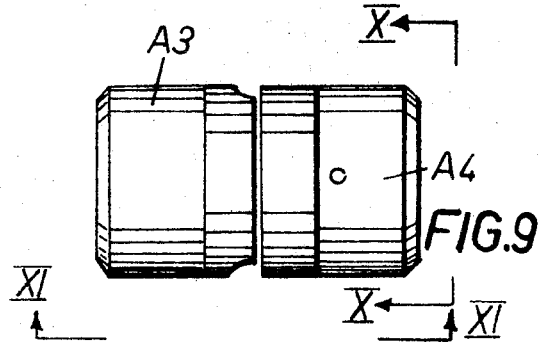
FIG. 9 is a side view of a second embodiment of hinge by which the shell and integral parts may be made of non-metallic or plastic material.
Figure 10:
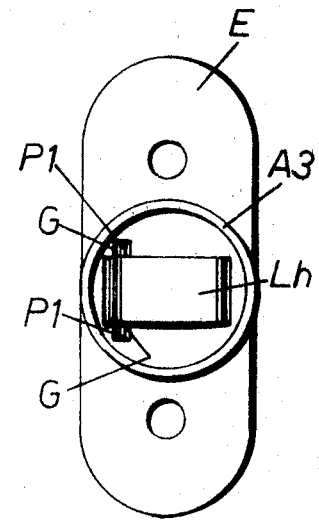
FIGS. 10 and 11 are views of the hinge shown in FIG. 9, in closed position, looking in the direction of arrows X—X and XI—XI of FIG. 9.
Figure 11:
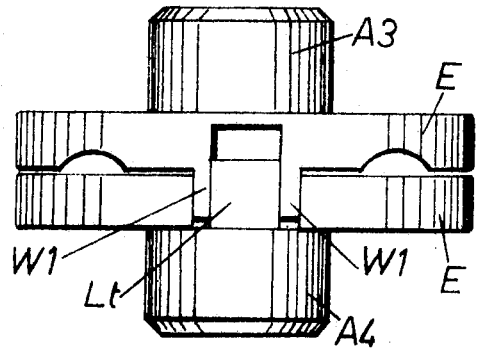
Figure 12:
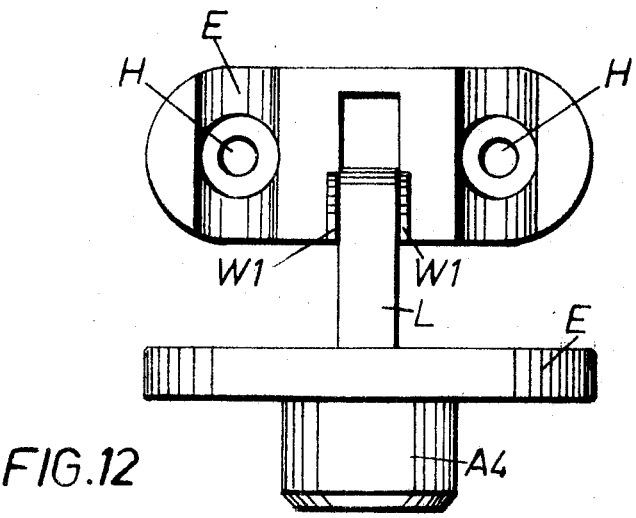
FIG. 12 is a front view of the hingle shown in FIG. 9, in open position.

With reference to FIGS. 1 through 8 of the drawings, the link hinge according to the invention, which is usually made completely of metallic material, such as brass, comprises a pair of hollow cylindrical shells A1-A2 hinged together by means of a link L. This link L, as clearly shown in FIGS. 7 and 8, is substantially C-shaped and is provided with a tail section Lt fastened in one of the shells A2 by means of a screw or pin F, while the C-shaped part projects out of said shell A2 and is provided with a curved guide slot S.

Figure 1:
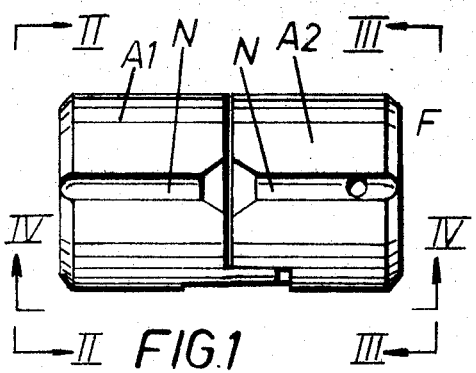
FIG. 1 is an outer side view of a link hinge according to the invention, in closed position.
Figure 2:
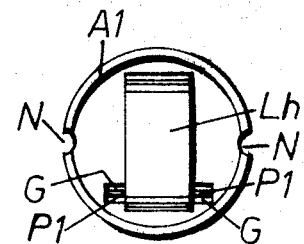
FIGS. 2, 3 and 4 are views of the same hinge looking in the direction of the arrows of lines II—II, III—III and IV—IV of FIG. 1.
Figure 4:
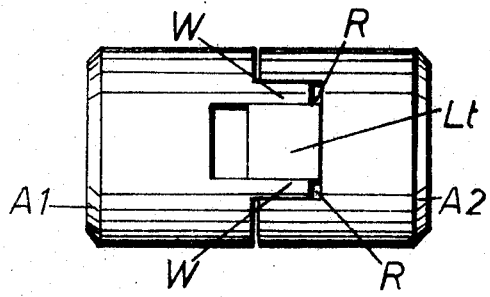
Figure 3:
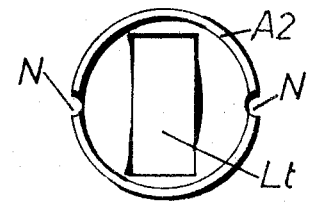
Figure 5:
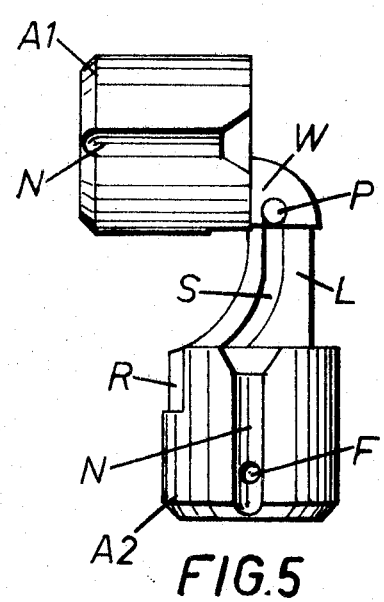
FIGS. 5 and 6 are respectively a side view and a front view of the same link hinge in fully open position.
Figure 6:
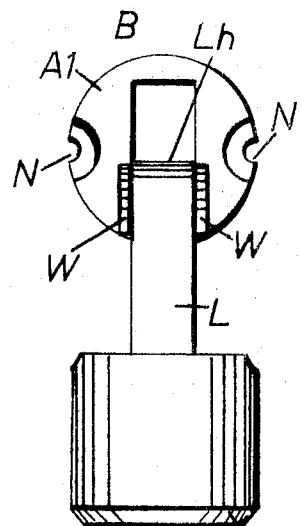

The other shell A1 is provided with a pair of outwardly projecting lugs or ears W which, when the two shells A1-A2 are swung adjacent to each other (as shown in FIGS. 4 and 7) insert themselves into a corresponding recess R in the opposite shell A2, on both sides of the outer part of the link tail Lt, FIG. 4. Lugs W are straddled by a hinge pin P, FIGS. 5, 7 and 8 passing through the slot S of the link L. Shell A1 is also provided at its interior with a pair of straight guide grooves G, FIGS. 7 and 8, extending parallel to the shell axis and substantially at the height of pin P. In these grooves, which extend from a position past the inner end of shell A1 to the outer end of said shell, are slidably inserted the sidewise projecting ends of a pin P1 fastened to the extremity of the link head Lh.

The fitting and operation of the just-described link hinge is apparent particularly when examining the FIGS. 7 and 8, where the hinge is shown mounted in two hinged parts H1-H2 (which may be a pair of panels, or wings, or a post and a wing, or the like) one of which, H2, may be provided with a joint-cover lath J which, in closing position extends above the joint between the hinged parts (FIG. 7).

Starting from this closing position, if one of the hinged parts H2 is swung towards open position (FIG. 8), due to the combined guide of the link L by the fixed pin P sliding along the curved slot S, while the projecting ends of pin P1 slide in the straight guide grooves G, the hinged part H2 is swung away from part H1 simultaneously in two directions, one being parallel to the axis of shell A1 and the other forming an angle with the ideal plane passing through the pair of guide grooves G, so that at the end of the swinging (FIG. 8) the hinged parts H1-H2 come to be with their adjoining ends slightly detached from each other and with the joint-covering lath J, fastened to hinged part H2, clear of the other hinged part H1.

The fastening of the hinge within the hinged parts may be effected, as in analogous hinges, by boring the parts in which the cylindrical shells A1-A2 should be inserted and by fastening same by suitable conventional or special clamping or fastening means.

In the embodiment as shown in FIGS. 1 through 8, in which the shell parts A1–A2 are metallic, the fastening may be effected in the most simple manner by milling in the outer shell part a number (usually a pair) of half-cylindrical recesses N provided with frusto-conical ends. By inserting the shell halves A1–A2 into corresponding bores of the hinged parts and by screwing conventional wood screws in correspondence of the ends of the half-circular recesses and the corresponding part of the bore wall of the hinged part in which the shell is inserted, the screw thread, pushed by the wall of the recesses N bite into the wood or like material of the bore in the hinged parts and fasten the hinge shell thereinto.

If desired, the hinge shells may be made also of hard plastic material: In this case, however, it is advisable to provide the shell halves A3–A4, FIGS. 9 through 12, with laterally projecting flanges E provided with holes H having the usual shape complementary to wood screw heads. In this case, however, shallow recesses should be made in the hinged parts H1–H2 as an extension of the bore inlet in which the shells are introduced, in order to encase therein the said flanges E.

In the case of the embodiment as shown in FIGS. 9 through 12, the metallic parts might be only the link L and the pins P and P1.

I claim:

1. In a link hinge the combination comprising, first and second tubular shell members arranged to be mounted in cooperative spaced relation to each other and having front and rear planar walls and interior portions, parallel spaced ears including transverse pin means extending from the planar wall of the first tubular shell, said first shell further including opposed channel means in its interior portion, complementally formed recesses in the second tubular shell arranged to receive the ears carried by the first shell, slotted link means extending from the second shell member, the pins means of the first shell member cooperating with the slotted link means of the second shell member and means carried at the free end of said link means arranged to cooperate with the channel means in said first shell member.

2. In a link hinge as claimed in claim 1, wherein each of said first and second tubular shell members are provided with diametrically opposed, outwardly opening, longitudinally extending recesses to receive a portion of a threaded fastening member.

3. In a link hinge as claimed in claim 1, wherein the front wall of each of the first and second tubular shell members are provided with perforated flange means.

4. In a link hinge as claimed in claim 1, wherein the spaced ears of the first tubular shell straddle the link means of the second tubular shell.

5. In a link hinge as claimed in claim 1, wherein the link means is associated with the second tubular shell medially thereof by pin means.

References Cited

UNITED STATES PATENTS

| | | | |
|---|---|---|---|
| 3,209,390 | 10/1965 | Bassan | 16—164 |
| 1,075,130 | 10/1913 | Streberger | 16—166 |
| 1,537,897 | 5/1925 | Steele | 16—166 |

BOBBY R. GAY, Primary Examiner

D. L. TROUTMAN, Assistant Examiner